(12) United States Patent
Liu et al.

(10) Patent No.: US 12,063,299 B2
(45) Date of Patent: Aug. 13, 2024

(54) DYNAMIC ENCRYPTION AND DECRYPTION METHOD AMONG LOCK CONTROL SYSTEM MODULES, MULTIPLE AUTHENTICATION LOCK CONTROL SYSTEM, LOCK CONTROL METHOD AND STRONGBOX

(71) Applicant: TRI STAR INC., Nantong (CN)

(72) Inventors: Jiayan Liu, Nantong (CN); Wenkun Chen, Nantong (CN); Xiaofeng Wang, Nantong (CN); Shuigen Lv, Nantong (CN)

(73) Assignee: TRI STAR INC., Nantong (CN)

( * ) Notice: Subject to any disclaimer, the term of this patent is extended or adjusted under 35 U.S.C. 154(b) by 262 days.

(21) Appl. No.: 17/781,620

(22) PCT Filed: Dec. 27, 2019

(86) PCT No.: PCT/CN2019/128961
§ 371 (c)(1),
(2) Date: Jun. 1, 2022

(87) PCT Pub. No.: WO2021/114412
PCT Pub. Date: Jun. 17, 2021

(65) Prior Publication Data
US 2023/0006822 A1    Jan. 5, 2023

(30) Foreign Application Priority Data
Dec. 12, 2019   (CN) .......................... 201911271705.6

(51) Int. Cl.
*H04L 29/06*    (2006.01)
*G07C 9/00*    (2020.01)
(Continued)

(52) U.S. Cl.
CPC ........ *H04L 9/0866* (2013.01); *G07C 9/00563* (2013.01); *H04L 9/0869* (2013.01); *H04L 9/3231* (2013.01)

(58) Field of Classification Search
CPC ... H04L 9/0866; H04L 9/0869; H04L 9/3231; H04L 9/0656; H04L 69/26; G07C 9/00563; G07C 9/00912; G07C 9/00174
See application file for complete search history.

(56) References Cited

U.S. PATENT DOCUMENTS 10,515,236 B1 * 12/2019 Yu ........................... G06F 21/78
2018/0131676 A1 * 5/2018 Torvinen ................... H04L 9/06
(Continued)

OTHER PUBLICATIONS

Jin, Zhe, et al. "Biometric cryptosystems: a new biometric key binding and its implementation for fingerprint minutiae-based representation." Pattern Recognition 56 (2016): 50-62. (Year: 2016).*

*Primary Examiner* — Ka Shan Choy
(74) *Attorney, Agent, or Firm* — CBM PATENT CONSULTING, LLC (57) ABSTRACT

Dynamic encryption and decryption method among lock control system modules comprise the following steps: step 1. filling hardware ID data, an unlocking communication protocol and a mask variable into an array according to a predefined variable space, and encrypting the array based on the mask variable to obtain an encrypted array; step 2. decrypting the encrypted array based on the mask variable to obtain a decrypted array, executing data division on the decrypted array according to the predefined variable space, matching the divided data with data recorded in advance one by one, and if the divided data are consistent with the data recorded in advance, executing related operations according to the decrypted unlocking communication protocol content; otherwise, executing no operation.

11 Claims, 6 Drawing Sheets algorithm model diagram (51) Int. Cl.
*H04L 9/08* (2006.01)
*H04L 9/32* (2006.01)

(56) References Cited

U.S. PATENT DOCUMENTS

| | | | | |
|---|---|---|---|---|
| 2019/0299932 | A1* | 10/2019 | Porteret | G07C 9/00563 |
| 2019/0304227 | A1* | 10/2019 | Chen | G07C 9/00563 |
| 2019/0311097 | A1* | 10/2019 | Lin | G06F 21/71 |
| 2020/0098207 | A1* | 3/2020 | Liao | G07C 9/00309 |
| 2020/0285726 | A1* | 9/2020 | Kalous | H04L 63/0853 |

\* cited by examiner

DYNAMIC ENCRYPTION AND DECRYPTION METHOD AMONG LOCK CONTROL SYSTEM MODULES, MULTIPLE AUTHENTICATION LOCK CONTROL SYSTEM, LOCK CONTROL METHOD AND STRONGBOX

TECHNICAL FIELD

The present invention belongs to the technical field of authentication and unlocking, and particularly relates to a dynamic encryption and decryption method among lock control system modules, a multiple authentication lock control system, a lock control method and a strongbox.

BACKGROUND

The existing product often adopts an optical fingerprint module and a monocular face recognition camera, and the fingerprint identification and the face identification adopts a mode in which unlocking is achieved by single identification. Meanwhile, a biometric identification module of the existing product sends a relay signal to an execution control panel, and the execution control panel controls a motor to rotate so as to open the door. Data signal transmission between the biometric identification control panel and the execution control panel is not encrypted.

The defects and reasons in the prior art are analyzed as follows:
1. Considering the fingerprint acquisition principle of an optical fingerprint module, the silica gel false fingerprint can easily imitate the real fingerprint lines, and the fingerprint image obtained in the fingerprint acquisition process of the optical fingerprint module is very similar to the real fingerprint image, so that the false fingerprint is mistakenly read as the real fingerprint by the optical fingerprint module algorithm, which causes low safety only by adopting the optical fingerprint module;
2. Considering the face identification principle of a monocular face recognition camera, the monocular face recognition camera can only compare face features without a biometric identification function, that is, an algorithm of the monocular face recognition camera is easy to be cracked by a color picture of a human and a silica gel face mask, so that the problem of low safety still exists;
3. In the prior art, a strongbox door can be opened by adopting one of fingerprint identification and face identification, single identification and authentication has poor safety and is easy to be cracked, resulting in the opening of the strongbox door;
4. In the prior art, the biometric identification module sends a relay signal to the execution control panel, if a person punches a hole from the outside of a strongbox body, and finds the wires of the biometric identification module and the execution control panel, the execution control panel is also switched on after the wires are lapped and supplied with power, and the motor is controlled to open the strongbox door, so that the strongbox door is opened after easy damage by the person;
5. In the prior art, communication signals between the biometric identification control panel and the execution control panel are fixed, if a person forces open the biometric identification control panel, and steals the fixed communication signals between the biometric identification control panel and the execution control panel, and then the execution control panel can control the motor to open the strongbox door by transmitting the simulated fixed communication signals to the execution control panel.

SUMMARY

Objective

In order to solve the problems in the prior art, the present invention discloses a dynamic encryption and decryption method among lock control system modules, a multiple authentication lock control system, a lock control method and a strongbox.

The technical scheme adopted by the present invention is as follows: a dynamic encryption and decryption method among lock control system modules comprises the following steps:
step 1. filling hardware ID data, an unlocking communication protocol and a mask variable into an array according to a predefined variable space, and encrypting the array based on the mask variable to obtain an encrypted array;
step 2. decrypting the encrypted array based on the mask variable to obtain a decrypted array, executing data division on the decrypted array according to the predefined variable space, matching the divided data with data recorded in advance one by one, and if the divided data are consistent with the data recorded in advance, executing related operations according to the decrypted unlocking communication protocol content; otherwise, executing no operation.

Further, the lock control system module comprises a biometric identification module and an execution control panel; the hardware ID data includes biometric identification module ID data.

Further, before executing the step 1, the method further comprises:
executing biometric identification module ID data binding on the biometric identification module and the execution control panel;
defining a variable space 1 according to a length of the biometric identification module ID data, defining a variable space 2 according to a length of the mask variable, and defining a variable space 3 according to a length of the unlocking communication protocol;
the step 1 specifically comprises:
S10: acquiring the biometric identification module ID data and the unlocking communication protocol, and randomly generating random number seed information as the mask variable by a random number generator;
S11: filling the biometric identification module ID data in the variable space 1, filling the random number seed in the variable space 2, and filling the unlocking communication protocol in the variable space 3 to form an array;
S12: encrypting the array based on the random number seed to obtain the encrypted array.

Further, before executing the step 1, the method further comprises:
S00: defining a variable space 1 according to a length of the biometric identification module ID data and a length of communication session number, defining a variable space 2 according to a length of the mask variable, and defining a variable space 3 according to a length of the unlocking communication protocol;
the step 1 specifically comprises:

S10: acquiring the biometric identification module ID data, the communication session number and the unlocking communication protocol, and randomly generating random number seed information as the mask variable by a random number generator;

S11: filling the biometric identification module ID data and the communication session number in the variable space 1, filling the random number seed in the variable space 2, and filling the unlocking communication protocol in the variable space 3 to form an array;

S12: encrypting the array based on the random number seed to obtain the encrypted array.

Further, the step 2 specifically comprises:

S20: decrypting the encrypted array obtained in the step S12 based on the random number seed to obtain the decrypted array;

S21: executing variable space division on the decrypted array according to the variable space defined in the step S00 to obtain data corresponding to the variable space 1, the variable space 2 and the variable space 3;

S22: matching the data in each variable space obtained in the step S21 with the data recorded in advance one by one, and if the data in each variable space are consistent with the data recorded in advance, executing related operations according to the decrypted unlocking communication protocol content; otherwise, executing no operation.

The present invention also discloses a multiple authentication lock control system, which comprises a biometric identification module, an execution control panel and an unlocking mechanical assembly, wherein the execution control panel is bound with the biometric identification module by a physical address;

the biometric identification module comprises a plurality of identification modules, signal generation modules and encryption modules which sequentially execute identity identification;

the identification module is used for executing user identity authentication;

the signal generation module is used for generating a fixed communication signal according to a successful identification signal sent by the identification module, wherein the fixed communication signal comprises biometric identification panel ID data, an unlocking communication protocol and a mask variable;

the encryption module is internally provided with the dynamic encryption and decryption method among lock control system modules, and is used for encrypting the fixed communication signal generated by the signal generation module to obtain a dynamic communication signal;

the execution control panel comprises a decryption module, a determination module and a driving module for driving the unlocking mechanical assembly to complete an unlocking action;

the decryption module is internally provided with the dynamic encryption and decryption method among lock control system modules, and is used for decrypting the dynamic communication signal from the biometric identification panel to obtain the decrypted communication signal, comparing the decrypted communication signal with information recorded by the decryption module, and sending a related command according to the comparison result;

the driving module is used for receiving the command from the decryption module and sending a corresponding electric signal to the unlocking mechanical assembly according to the command from the decryption module so as to drive the unlocking mechanical assembly to complete the unlocking action.

Further, the identification module comprises two or more of a fingerprint identification module, a face identification module and a touch password pad; wherein the fingerprint identification module comprises a capacitance fingerprint collector and an identification module internally provided with a fingerprint identification algorithm; the face identification module comprises a binocular face recognition camera and an identification module internally provided with a face identification algorithm, and the binocular face recognition camera is an infrared camera.

Further, the unlocking mechanical assembly comprises an electric push rod moving back and forth under control of the electric signal outputted by the execution control panel, a first micro switch for controlling door closing in place, and a second micro switch for controlling door opening in place; a driving end of the electric push rod is fixedly connected with a bolt connecting plate, the first micro switch is arranged above the electric push rod, and when the bolt connecting plate moves forward to the maximum distance, the bolt connecting plate touches the first micro switch through a connecting rod; the second micro switch is arranged below the electric push rod and is positioned at the maximum retraction distance of a bolt fixing plate, and the bolt connecting plate is fixed on the bolt fixing plate.

The present invention also discloses a lock control method used for an intelligent lock control system, wherein the intelligent lock control system comprises a biometric identification module, an execution control panel and an unlocking mechanical assembly; the biometric identification module comprises two or more of a fingerprint identification module, a face identification module and a touch password pad;

the method comprises the following steps:

S1: executing biometric identification module ID data binding on the biometric identification module and the execution control panel, and achieving an unlocking communication protocol by the biometric identification module and the execution control panel;

S2: executing identity authentication on current user by the biometric identification panel, if the identity authentication is successful, executing S3, and otherwise, prompting an identification error by the biometric identification panel;

S3: generating a fixed communication signal, encrypting the fixed communication signal by adopting the dynamic encryption and decryption method among lock control system modules, generating a dynamic communication signal, and sending the dynamic communication signal to the execution control panel; the fixed communication signal comprises biometric identification panel ID data, an unlocking communication protocol and a mask variable;

S4: executing decryption and match determination on the received dynamic communication signal by the execution control panel by adopting the dynamic encryption and decryption method among lock control system modules, and if the matching is successful, executing related operations according to the decrypted unlocking communication protocol content; otherwise, executing no operation.

Further, the S2 specifically comprises the following sub-steps:

executing fingerprint acquisition and identification on the current user by a fingerprint acquisition module, activating a face identification module to execute face identification on the current user after the fingerprint identification is successful, and executing S3 after the face identification is successful;

when failure times of the fingerprint identification or the face identification exceed a set value, activating a touch password pad, executing identity authentication by inputting a password, if the authentication is successful, executing S3, otherwise, prompting identity authentication failure by the biometric identification module.

The present invention also discloses a strongbox, which comprises a box body and a strongbox door adopting the multiple authentication lock control system, the biometric identification module is arranged on the strongbox door, the execution control panel is arranged inside the strongbox door, and the unlocking mechanical assembly is linked with a bolt connecting plate and a bolt fixing plate of the strongbox door.

Advantageous Effects

The present invention has the following advantages:
1. The system of the present invention adopts a capacitance fingerprint collector and a fingerprint identification algorithm thereof, wherein the capacitance fingerprint collector can effectively determine the non-human fingerprints such as the silica gel fingerprint mold, thereby improving the safety of fingerprint identification. The false identification rate of the currently used fingerprint identification algorithm reaches one millionth, and the system of the present invention adopts a binocular face recognition camera and a face identification algorithm thereof; the binocular face identification module has an infrared function and can be used under bright light and dark light, the face identification algorithm used by the present invention can prevent the attack of black-and-white face pictures, color face pictures, liquid crystal display face pictures and 3D silica gel face masks, and the false identification rate of the used face identification algorithm reaches one millionth.
2. The system of the present invention sets a mode that unlocking is achieved only by fingerprint identification and face identification of the same user, that is, the person has to first pass the fingerprint identification and then pass face identification before unlocking, and the dual-authentication mode improves the safety level of products.
3. According to the system of the present invention, the biometric identification module and the execution control panel are registered and bound, and the execution control panel can identify the ID number of the biometric identification module after registration and binding; if the ID number is incorrect, the execution control panel will not execute unlocking, which can avoid that the strongbox is unlocked after the forcible replacement of the biometric identification module or the strongbox is opened by a simple switch signal, thus improving the safety level of products.
4. The communication protocol sent to the execution control panel by the biometric identification module of the present invention is encrypted by an encryption algorithm, the encrypted communication protocol changes every time, and then the execution control panel decrypts the encrypted communication protocol, determines the ID number of the biometric identification module and executes unlocking. Firstly, the mode of unlocking by communication protocol avoids a person directly control the electric push rod to unlock through power on; secondly, this mode avoids a person to steal the communication protocol and then send it to the execution control panel for unlocking through a fixed communication protocol. Therefore, this mode improves the safety level of the products.

DETAILED DESCRIPTION

For a better understanding of the objective, technical scheme and advantages of the present invention, the present invention is further illustrated below with reference to the following detailed description.

Embodiment 1

Figure 5:
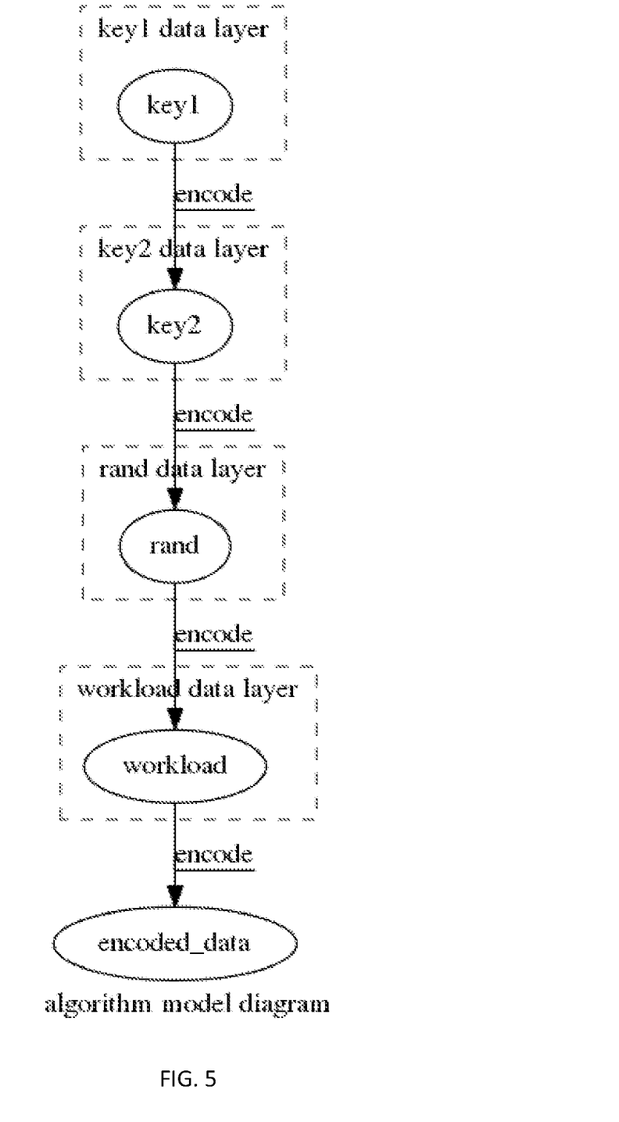
FIG. 5 is a schematic flowchart of the encryption algorithm according to the present invention.
Figure 6:
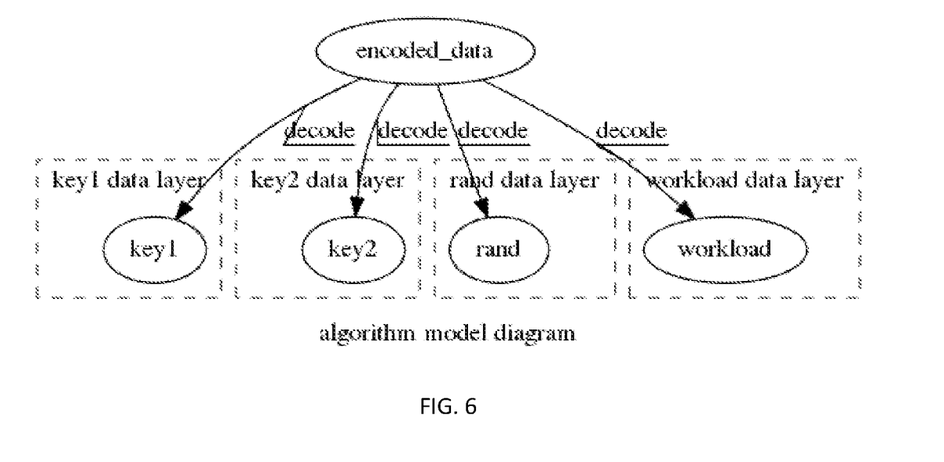
FIG. 6 is a schematic diagram of the decryption process according to the present invention.

As shown in FIG. 5 and FIG. 6, the present embodiment is a dynamic encryption and decryption method among lock control system modules, specifically, the lock control system module comprises a biometric identification module and an execution control panel; the method specifically comprises the following steps:

defining a variable space 1 according to a length of the biometric identification module ID data, defining a variable space 2 according to a length of the mask variable, and defining a variable space 3 according to a length of the unlocking communication protocol;

acquiring the biometric identification module ID data and the unlocking communication protocol, and randomly generating random number seed information as the mask variable by a random number generator;

filling the biometric identification module ID data in the variable space 1, filling the random number seed in the variable space 2, and filling the unlocking communication protocol in the variable space 3 to form an array;

encrypting the array based on the random number seed to obtain the encrypted array;

decrypting, by the execution control panel, the obtained encrypted array based on the random number seed to obtain the decrypted array;

executing variable space division on the decrypted array according to the predefined variable space to obtain data corresponding to the variable space 1, the variable space 2 and the variable space 3;

matching the data in each variable space with the data recorded in advance one by one, and if the data in each variable space are consistent with the data recorded in advance, executing related operations according to the decrypted unlocking communication protocol content; otherwise, executing no operation.

In the present embodiment, an order of the variable spaces may be specified in advance, for example, the order of the specified variable spaces is variable space 1, variable space 2 and variable space 3; after decryption, data corresponding to each variable space is obtained, for example, data in the variable space 1 is XXXX, data in the variable space 2 is XXXXX, and data in the variable space 3 is XXX; and then the matching is executed sequentially, that is, the data in the variable space 1 are matched firstly, if the data are consistent with the data recorded in advance, the data in the variable space 2 are matched, and if inconsistent, the next matching is not executed, and so on.

For convenience of understanding, a pseudo-code description of the method of the present embodiment is now provided:

An encryption function:
defining a variable space 1
defining a variable space 2
defining a variable space 3
setting mask variable=80 h
cycling 8 times for treatment
if AND operation value of unlocking communication protocol and mask variable is not 0
the i/4 rounded subscript variable content of the target address is shifted to the left by 1 bit
the i/4 rounded subscript variable content of the target address is subjected to AND operation with 1 h, and the result is still kept at the target
the i/4 rounded subscript variable content of the target address is shifted to the left by 1 bit, and the result is still kept at the target
the i/4 rounded subscript variable content of the target address is subjected to OR operation with 1 h, and the result is still kept at the target
if AND operation value of unlocking communication protocol and mask variable is 0
the i/4 rounded subscript variable content of the target address is shifted to the left by 1 bit, and the result is still kept at the target
the i/4 rounded subscript variable content of the target address is subjected to OR operation with 1 h, and the result is still kept at the target
the i/4 rounded subscript variable content of the target address is shifted to the left by 1 bit, and the result is still kept at the target
the i/4 rounded subscript variable content of the target address is subjected to AND operation with 1 h, and the result is still kept at the target
the mask variable is shifted to the right by 1 bit
Internal unlocking function of encrypted value:
defining a variable space
if the i/4 rounded subscript variable content of the data source address is subjected to AND operation with 80 h, and the result is not 0
the variable c is shifted to the left by 1 bit
the variable content is subjected to AND operation with 1 h, and the result is still kept at the target
the variable c is shifted to the left by 1 bit
the variable content is subjected to OR operation with 1 h, and the result is still kept at the target
the i/4 rounded subscript variable content of the data source address is shifted to the left by 2 bit
returning the operation result in the C.

The unlocking communication protocol of the present embodiment requires the biometric identification module and the execution control panel to be in agreement in advance, for example, the content of the communication protocol is 001, which represents unlocking; 002 represents opening other devices such as light, and the protocol content is set in advance.

Embodiment 2

The difference between the present embodiment and the embodiment 1 is that a communication session number is also introduced in the present embodiment; the method specifically comprises the following steps:

defining a variable space 1 according to a length of the biometric identification module ID data and a length of communication session number, defining a variable space 2 according to a length of the mask variable, and defining a variable space 3 according to a length of the unlocking communication protocol;

acquiring the biometric identification module ID data, the communication session number and the unlocking communication protocol, and randomly generating random number seed information as the mask variable by a random number generator;

filling the biometric identification module ID data and the communication session number in the variable space 1, filling the random number seed in the variable space 2, and filling the unlocking communication protocol in the variable space 3 to form an array;

encrypting the array based on the random number seed to obtain the encrypted array;

decrypting the obtained encrypted array based on the random number seed to obtain the decrypted array;

executing variable space division on the decrypted array according to the defined variable space to obtain data corresponding to the variable space 1, the variable space 2 and the variable space 3;

matching the obtained data in each variable space with the data recorded in advance one by one, and if the data in each variable space are consistent with the data recorded in advance, executing related operations according to the decrypted unlocking communication protocol content; otherwise, executing no operation.

Embodiment 3

On the basis of embodiment 1 or embodiment 2, the present embodiment provides a multiple authentication lock control system, which can be applied to a strongbox, and specifically comprises a biometric identification panel 1, an execution control panel 2 bound with the biometric identification module by a physical address, and an unlocking mechanical assembly for controlling the opening and closing of a strongbox door; the biometric identification panel 1 is arranged on the strongbox door and used for executing fingerprint identification and face identification, and the execution control panel 2 is arranged inside the strongbox door and electrically connected with the biometric identification panel 1 through a TTL interface and used for decrypting communication signals sent by the biometric identification panel 1 and determining whether to open the strongbox door according to the decrypted signal.

Specifically, the biometric identification module of the present embodiment follows the RS232 communication protocol and comprises a plurality of identification modules, signal generation modules and encryption modules which sequentially execute identity identification; the identification module is used for executing user identity authentication; the signal generation module is used for generating a fixed communication signal according to a successful identification signal sent by the identification module; the encryption module is internally provided with the dynamic encryption and decryption method among lock control system modules disclosed by embodiment 1 and embodiment 2, and is used for encrypting a fixed communication signal generated by the signal generation module to obtain a dynamic communication signal; the fixed communication signal and the dynamic communication signal each include ID data of the biometric identification panel.

The identification module of the present embodiment comprises two or more of a fingerprint identification module, a face identification module and a touch password pad; wherein the fingerprint identification module comprises a capacitance fingerprint collector and an identification module internally provided with a fingerprint identification algorithm; the face identification module comprises a binocular face recognition camera and an identification module internally provided with a face identification algorithm, and the binocular face recognition camera is an infrared camera. In the present invention, the fingerprint identification module is adopted for realizing user fingerprint scanning identification. The face identification module can complete face scanning identification of a user through the camera after the successful identification of the fingerprint identification module. The signal generation module is used for generating a fixed communication signal comprising an ID number of a biometric identification panel after the successful identification of the face identification module. The encryption module converts the fixed communication signal into dynamic communication signal, and the dynamic communication signal are not repeated each time due to encryption based on a random number; when the failure times of fingerprint identification or face identification of the same user exceed a set value, a touch password pad is activated, the user can complete identification by inputting a password, and after the successful identification by the password, the signal generation module can also generate a fixed communication signal comprising ID data of the biometric identification panel; specifically, the fixed communication signal comprises biometric identification panel ID data, an unlocking communication protocol and a mask variable.

The fingerprint identification module of the present embodiment adopts a capacitance fingerprint collector and a fingerprint identification algorithm thereof to realize fingerprint identification, and the capacitance fingerprint collector can effectively determine the non-human fingerprints such as the silica gel fingerprint mold, and the face identification module of the present embodiment adopts a binocular face recognition camera and a face identification algorithm thereof to realize binocular face identification, and this binocular face recognition camera has an infrared function.

The execution control panel of the present embodiment comprises a decryption module, a determination module and a driving module for driving the unlocking mechanical assembly to complete an unlocking action; the decryption module is internally provided with the dynamic encryption and decryption method among lock control system modules disclosed in embodiment 1 and embodiment 2, and is used for decrypting the dynamic communication signal from the biometric identification panel to obtain the decrypted communication signal, comparing the decrypted communication signal with information recorded by the decryption module, and sending a related command according to the comparison result; the driving module is used for receiving the command from the decryption module and sending a corresponding electric signal to the unlocking mechanical assembly according to the command from the decryption module so as to drive the unlocking mechanical assembly to complete the unlocking action.

Figure 1:
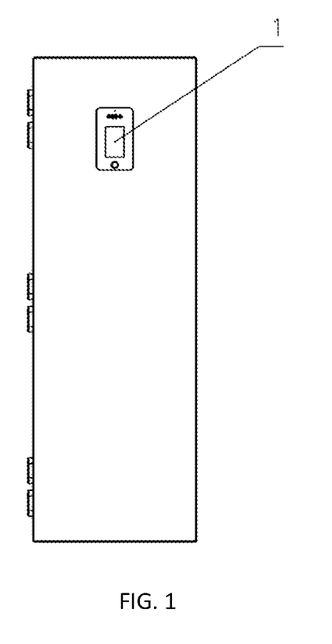
FIG. 1 is a schematic diagram of the position of the biometric identification panel according to the present invention.
Figure 2:
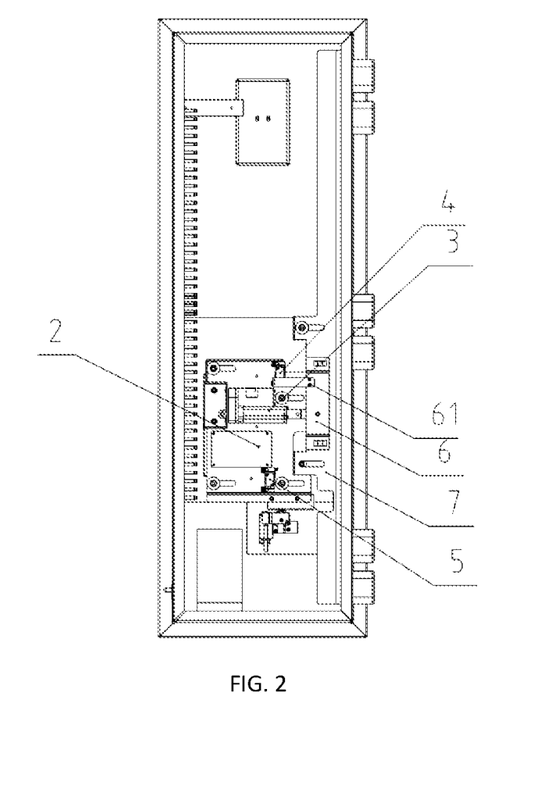
FIG. 2 is a schematic diagram of the structure of the execution control panel according to the present invention.
Figure 3:
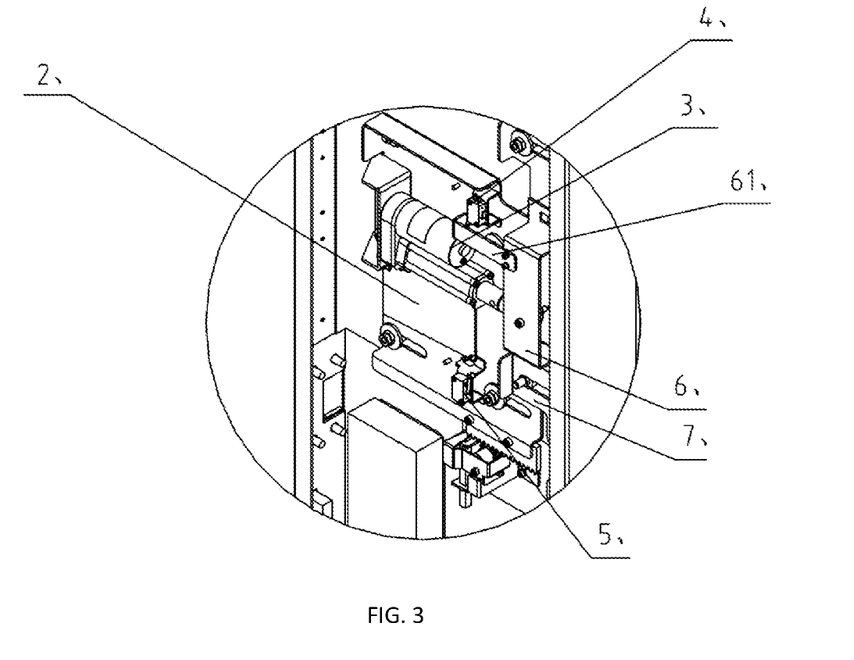
FIG. 3 is a schematic diagram of the mechanical part of the strongbox according to the present invention.
Figure 4:
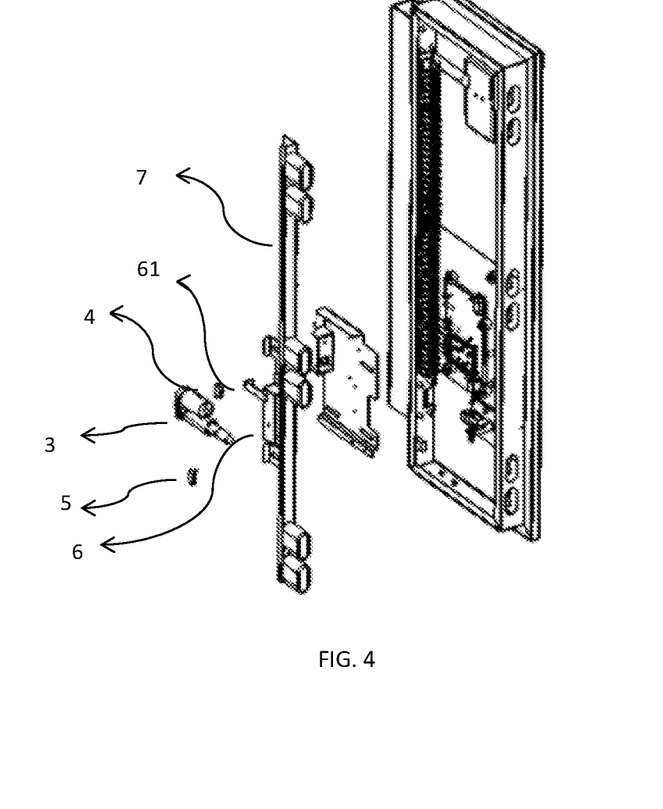
FIG. 4 is an exploded schematic diagram of FIG. 3.

As shown in FIGS. 1, 2 and 3, the unlocking mechanical assembly of the present embodiment comprises an electric push rod 3 moving back and forth under control of the electric signal outputted by the execution control panel, a first micro switch 4 for controlling door closing in place, and a second micro switch 5 for controlling door opening in place; the electric push rod 3, the first micro switch 4 and the second micro switch 5 are all arranged on an inner side of a strongbox door; a driving end of the electric push rod 3 is fixedly connected with a bolt connecting plate 6, and the electric push rod 3 moves back and forth under control of the electric signal outputted by the execution control plate 2, so that the bolt connecting plate 6 is driven to move back and forth; the first micro switch 4 is arranged above the electric push rod 3, when the bolt connecting plate 6 moves forward to the maximum distance, the bolt connecting plate 6 touches the first micro switch 4 through a connecting rod 61, the first micro switch 4 is turned off, the current of the electric push rod 3 is cut off, the electric push rod 3 stops moving forward, and the strongbox door is locked; the second micro switch 5 is arranged below the electric push rod 3 and located at the maximum retraction distance of the bolt fixing plate 7, when a correct fixing signal is obtained by the decryption of the execution control plate 2, the electric push rod 3 is controlled to drive the bolt fixing plate 7 to retract, the bolt fixing plate 7 touches the second micro switch 5 in the retraction process, the second micro switch 5 is turned off, the current of the electric push rod 3 is cut off, the electric push rod 3 stops retraction, the strongbox door is opened, and the bolt connecting plate 6 is fixed on the bolt fixing plate 7.

Embodiment 4

The present invention discloses a lock control method used for an intelligent lock control system, wherein the intelligent lock control system comprises a biometric identification module, an execution control panel and an unlocking mechanical assembly; the biometric identification module comprises two or more of a fingerprint identification module, a face identification module and a touch password pad; the method comprises the following steps:

S1: executing ID number binding on the biometric identification module and the execution control panel, so as to ensure that unlocking can not be realized even if the biometric identification module is replaced, and achieving an unlocking communication protocol by the biometric identification module and the execution control panel;

S2: executing identity authentication on current user by the biometric identification panel, if the identity authentication is successful, executing S3, and otherwise, prompting an identification error by the biometric identification panel; the S2 specifically comprises the following sub-steps:

executing fingerprint acquisition and identification on the current user by a fingerprint acquisition module, activating a face identification module to execute face identification on the current user after the fingerprint identification is successful, and executing S3 after the face identification is successful; otherwise, prompting, by the biometric identification panel, an identification error;

when failure times of the fingerprint identification or the face identification exceed a set value, activating a touch password pad, executing identity authentication by inputting a password, if the authentication is successful, executing S3, and otherwise, prompting identity authentication failure by the biometric identification module;

S3: generating a fixed communication signal including the ID number of the biometric identification panel, encrypting the fixed communication signal by adopting the dynamic encryption and decryption method among lock control system modules disclosed in embodiment 1 or embodiment 2 to generate a dynamic communication signal, and sending the dynamic communication signal to the execution control panel through a TTL interface;

S4: executing decryption and match determination on the received dynamic communication signal by the execution control panel by adopting the dynamic encryption and decryption method among lock control system modules disclosed in the embodiment 1 or the embodiment 2, if the matching is successful, executing the opening of the strongbox; otherwise, executing no operation.

Embodiment 5

The lock control method of the present embodiment is used for an intelligent lock control system, and the intelligent lock control system comprises a biometric identification module, an execution control panel and an unlocking mechanical assembly; the biometric identification module comprises a fingerprint identification module, a face identification module and a touch password pad; the method comprises the following steps:

step 1: executing physical address binding (MAC ID binding) on the biometric identification module and the execution control panel so as to ensure that unlocking can not be realized even if the biometric identification module is replaced;

step 2: identifying the fingerprint information of the current user and comparing the fingerprint information with registered fingerprint information in a fingerprint database by the biometric identification panel; if the comparison is successful, executing step 3 for face identification, and otherwise, determining whether the identification failure times exceed 3 times; if so, activating a touch password pad for password identification by the user; if the password identification is successful, generating, by the biometric identification panel, a fixed communication signal comprising the ID number of the biometric identification panel, encrypting the fixed communication signal by adopting an encryption algorithm to generate an encrypted communication signal changing every time, sending the encrypted communication signal to the execution control panel through a TTL interface, and executing step 4; if the password identification fails, displaying, by the biometric identification panel, that the identification fails; if the identification failure times do not exceed 3 times, continuing to execute fingerprint identification until the identification times exceed 3 times, or the fingerprint identification is successful and then executing the step 3;

step 3: identifying the face information of the current user and comparing the face information with registered face information in a face database by the biometric identification panel; if the comparison is successful, generating, by the biometric identification panel, a fixed communication signal comprising the ID number of the biometric identification panel, encrypting the fixed communication signal by adopting an encryption algorithm to generate an encrypted communication signal changing every time, and sending the encrypted communication signal to the execution control panel through a TTL interface, and otherwise, determining whether the identification failure times exceed 3 times; if so, activating a touch password pad for password identification by the user; if the password identification is successful, generating, by the biometric identification panel, a fixed communication signal comprising the ID number of the biometric identification panel, encrypting the fixed communication signal by adopting an encryption algorithm to generate an encrypted communication signal changing every time, sending the encrypted communication signal to the execution control panel through a TTL interface, and executing step 4; if the password identification fails, displaying, by the biometric identification panel, that the identification fails; if the identification failure times do not exceed 3 times, continuing to perform face identification until the identification times exceed 3 times, or the face identification is successful and then executing the step 4;

step 4: decrypting, by the execution control panel, the received encrypted communication signal to obtain a communication signal, comparing the communication signal with data recorded by the execution control panel, if the communication signal is identical with the data recorded by the execution control panel, controlling, by the execution control panel, the motor to open the strongbox door, and otherwise, the execution control panel cannot open the strongbox door.

In the present embodiment, when face identification is executed and identification still fails after the identification time exceeds 5 s, password identification is executed.

Embodiment 6

The present embodiment discloses a strongbox comprising a box body and a strongbox door adopting the multiple authentication lock control system according to the embodiment 3, the biometric identification module is arranged on the strongbox door, the execution control panel is arranged inside the strongbox door, and the unlocking mechanical assembly is linked with a bolt connecting plate of the strongbox door.

What is claimed is:

1. A dynamic encryption and decryption method among lock control system modules, comprising the following steps:

step 1. filling hardware identification (ID) data, an unlocking communication protocol and a mask variable into an array according to a predefined variable space, and encrypting the array based on the mask variable to obtain an encrypted array; and step 2. decrypting the encrypted array based on the mask variable to obtain a decrypted array, executing data division on the decrypted array according to the predefined variable space to produce a divided data, matching the divided data with data recorded in advance one by one, and if the divided data are consistent with the data recorded in advance, executing related operations according to a decrypted unlocking communication protocol content; otherwise, executing no operation.

2. The dynamic encryption and decryption method among lock control system modules according to claim 1, wherein: the lock control system module comprises a biometric identification module and an execution control panel; the hardware ID data includes biometric identification module ID data.

3. The dynamic encryption and decryption method among lock control system modules according to claim 2, wherein: before the step 1 is executed, the method further comprises the following steps:
   executing biometric identification module ID data binding on the biometric identification module and the execution control panel;
   defining a variable space 1 according to a length of the biometric identification module ID data, defining a variable space 2 according to a length of the mask variable, and defining a variable space 3 according to a length of the unlocking communication protocol;
   the step 1 specifically comprises:
      S10: acquiring the biometric identification module ID data and the unlocking communication protocol, and randomly generating random number seed information as the mask variable by a random number generator;
      S11: filling the biometric identification module ID data in the variable space 1, filling the random number seed in the variable space 2, and filling the unlocking communication protocol in the variable space 3 to form an array; and
      S12: encrypting the array based on the random number seed to obtain the encrypted array.

4. The dynamic encryption and decryption method among lock control system modules according to claim 2, wherein: before the step 1 is executed, the method further comprises the following steps:
   S00: defining a variable space 1 according to a length of the biometric identification module ID data and a length of communication session number, defining a variable space 2 according to a length of the mask variable, and defining a variable space 3 according to a length of the unlocking communication protocol;
   the step 1 specifically comprises:
   S10: acquiring the biometric identification module ID data, the communication session number and the unlocking communication protocol, and randomly generating random number seed information as the mask variable by a random number generator;
   S11: filling the biometric identification module ID data and the communication session number in the variable space 1, filling the random number seed in the variable space 2, and filling the unlocking communication protocol in the variable space 3 to form an array; and
   S12: encrypting the array based on the random number seed to obtain the encrypted array.

5. The dynamic encryption and decryption method among lock control system modules according to claim 4, wherein the step 2 specifically comprises:
   S20: decrypting the encrypted array obtained in the step S12 based on the random number seed to obtain the decrypted array;
   S21: executing variable space division on the decrypted array according to the variable space defined in the step S00 to obtain data corresponding to the variable space 1, the variable space 2 and the variable space 3; and
   S22: matching the data in each variable space obtained in the step S21 with the data recorded in advance one by one, and if the data in each variable space are consistent with the data recorded in advance, executing related operations according to the decrypted unlocking communication protocol content; otherwise, executing no operation.

6. A multiple authentication lock control system comprising at least one processor and at least one computer-readable storage medium having stored thereon instructions, which comprises a biometric identification module, an execution control panel and an unlocking mechanical assembly, wherein the execution control panel is bound with the biometric identification module by a physical address;
   the biometric identification module comprises a plurality of identification modules, a signal generation module and an encryption module which sequentially execute identity identification; wherein
   the biometric identification module, executed by the at least one processor, executes user identity authentication;
   the signal generation module, executed by the at least one processor, generates, a fixed communication signal according to a successful identification signal sent by the biometric identification module, wherein the fixed communication signal comprises biometric identification panel identification (ID) data, an unlocking communication protocol and a mask variable; and
   the encryption module, executed by the at least one processor, is internally provided with a dynamic encryption and decryption method among lock control system modules according to claim 1, and encrypts the fixed communication signal generated by the signal generation module to obtain a dynamic communication signal;
   the execution control panel comprises a decryption module, a determination module and a driving module, which drives the unlocking mechanical assembly to complete an unlocking action; wherein
   the decryption module, executed by the at least one processor, is internally provided with the dynamic encryption and decryption method among lock control system modules according to claim 1, and decrypts the dynamic communication signal from the biometric identification panel to obtain the decrypted communication signal, comparing the decrypted communication signal with information recorded by the decryption module, and sending a related command according to the comparison result; and
   the driving module, executed by the at least one processor, receives the related command from the decryption module and sending a corresponding electric signal to the unlocking mechanical assembly according to the related command from the decryption module so as to drive the unlocking mechanical assembly to complete the unlocking action.

7. The multiple authentication lock control system according to claim 6, wherein: the biometric identification module comprises two or more of a fingerprint identification module, a face identification module and a touch password pad; wherein the fingerprint identification module comprises a capacitance fingerprint collector and an identification module internally provided with a fingerprint identification algorithm; the face identification module comprises a binocular face recognition camera and an identification module internally provided with a face identification algorithm, and the binocular face recognition camera is an infrared camera.

8. The multiple authentication lock control system according to claim 6, wherein: the unlocking mechanical assembly comprises an electric push rod moving back and forth under control of the electric signal outputted by the execution control panel, a first micro switch that controls door closing in place, and a second micro switch that controls door opening in place; a driving end of the electric push rod is fixedly connected with a bolt connecting plate, the first micro switch is arranged above the electric push rod, and when the bolt connecting plate moves forwards to the maximum distance, the bolt connecting plate touches the first micro switch through a connecting rod; the second micro switch is arranged below the electric push rod and is positioned at the maximum retraction distance of a bolt fixing plate, and the bolt connecting plate is fixed on the bolt fixing plate.

9. A lock control method used for an intelligent lock control system, wherein the intelligent lock control system comprises a biometric identification module, an execution control panel and an unlocking mechanical assembly; the biometric identification module comprises two or more of a fingerprint identification module, a face identification module and a touch password pad;
the method comprises the following steps:
S1: executing biometric identification module identification (ID) data binding on the biometric identification module and the execution control panel, and achieving an unlocking communication protocol by the biometric identification module and the execution control panel;
S2: executing identity authentication on current user by a biometric identification panel, if the identity authentication is successful, executing S3, and otherwise, prompting an identification error by the biometric identification panel;
S3: generating a fixed communication signal, encrypting the fixed communication signal by adopting a dynamic encryption and decryption method among lock control system modules, generating a dynamic communication signal, and sending the dynamic communication signal to the execution control panel; the fixed communication signal comprises biometric identification panel ID data, an unlocking communication protocol and a mask variable; and
S4: executing decryption and match determination on the received dynamic communication signal by the execution control panel by adopting the dynamic encryption and decryption method among lock control system modules, and if the matching is successful, executing related operations according to the decrypted unlocking communication protocol content; otherwise, executing no operation.

10. The lock control method according to claim 9, wherein the S2 specifically comprises the following sub-steps:
executing fingerprint acquisition and identification on the current user by a fingerprint acquisition module, activating a face identification module to execute face identification on the current user after the fingerprint identification is successful, and executing S3 after the face identification is successful; and
when failure times of the fingerprint identification or the face identification exceed a set value, activating a touch password pad, executing identity authentication by inputting a password, if the authentication is successful, executing S3, otherwise, prompting identity authentication failure by the biometric identification module.

11. The multiple authentication lock control system according to claim 6, wherein a strongbox, comprising a box body and a strongbox door adopting the multiple authentication lock control system; the biometric identification module is arranged on the strongbox door, the execution control panel is arranged inside the strongbox door, and the unlocking mechanical assembly is linked with a bolt connecting plate and a bolt fixing plate of the strongbox door.

* * * * *